United States Patent
Milne

(10) Patent No.: US 11,620,778 B2
(45) Date of Patent: Apr. 4, 2023

(54) IMAGING SYSTEM FOR SUPERIMPOSING AT LEAST TWO IMAGES AND A RELATED METHOD

(71) Applicant: WILDGATE CONSULTANCY SOLUTIONS LIMITED, Dorset (GB)

(72) Inventor: Michael Milne, Dorset (GB)

( * ) Notice: Subject to any disclaimer, the term of this patent is extended or adjusted under 35 U.S.C. 154(b) by 0 days.

(21) Appl. No.: 17/608,131

(22) PCT Filed: May 6, 2020

(86) PCT No.: PCT/IB2020/054295
§ 371 (c)(1),
(2) Date: Nov. 1, 2021

(87) PCT Pub. No.: WO2020/225752
PCT Pub. Date: Nov. 12, 2020

(65) Prior Publication Data
US 2022/0319076 A1    Oct. 6, 2022

(30) Foreign Application Priority Data
May 6, 2019   (GB) ..................................... 1906356

(51) Int. Cl.
*G06T 11/60*   (2006.01)
*G06T 7/33*    (2017.01)
(Continued)

(52) U.S. Cl.
CPC ............ *G06T 11/60* (2013.01); *G06F 21/602* (2013.01); *G06T 3/20* (2013.01); *G06T 3/40* (2013.01);
(Continued)

(58) Field of Classification Search
CPC .......... G06V 10/25; G06T 2207/20212; G06T 11/60; G06T 3/40; G06T 7/33; G06T 3/20; G06T 11/001
See application file for complete search history.

(56) References Cited

U.S. PATENT DOCUMENTS 5,414,462 A     5/1995  Veatch
8,666,840 B1 *  3/2014  Matsas ................ G06Q 20/321
                                                    705/26.1
(Continued)

FOREIGN PATENT DOCUMENTS

| GB | 2583728 B | 6/2021 |
| WO | 2013106080 | 7/2013 |
| WO | 2013106080 A2 | 7/2013 |

OTHER PUBLICATIONS

"Letter for Search and Examination Report" in GB 1906356.9, dated Apr. 7, 2020.
(Continued)

*Primary Examiner* — Phi Hoang
(74) *Attorney, Agent, or Firm* — William H. Bollman

(57) ABSTRACT

An imaging system for superimposing at least two images, and a related method for superimposing at least two images, which images are obtained from separate or independent image sources. A single mapping based view of a user selected geographic area onto which multiple image data sets from separate computer systems are displayed whilst simultaneously isolating separate input data channels. At least one first image data set and/or a position code (generated by a position code generator) is transferred to a position code extractor via at least one secure transmission channel. The secure channel ensures isolation of input data from the separate input data channels of different computer systems. The first image is combined with a second image to provide a combined single image view of the selected geographic
(Continued)

area. Transmission of an image data set, with associated position code, negates the need to pass data sets between separate computer systems.

20 Claims, 11 Drawing Sheets

(51) Int. Cl.
  *G06V 10/25* (2022.01)
  *G06F 21/60* (2013.01)
  *G06T 3/20* (2006.01)
  *G06T 3/40* (2006.01)
  *G06T 11/00* (2006.01)

(52) U.S. Cl.
  CPC .............. *G06T 7/33* (2017.01); *G06T 11/001* (2013.01); *G06V 10/25* (2022.01); *G06T 2207/20212* (2013.01)

(56) References Cited

U.S. PATENT DOCUMENTS

| | | | | |
|---|---|---|---|---|
| 9,817,909 | B1* | 11/2017 | Gysin | G06K 19/06037 |
| 9,842,120 | B1* | 12/2017 | Siris | H04W 4/029 |
| 2005/0021202 | A1* | 1/2005 | Russell | H04B 7/18506 |
| | | | | 348/143 |
| 2008/0059889 | A1* | 3/2008 | Parker | G06F 16/29 |
| | | | | 715/748 |
| 2008/0068507 | A1 | 3/2008 | Krause et al. | |
| 2008/0170769 | A1* | 7/2008 | Assmann | G06V 10/26 |
| | | | | 382/128 |
| 2011/0043627 | A1 | 2/2011 | Werling et al. | |
| 2011/0206286 | A1* | 8/2011 | Taketa | H04N 19/127 |
| | | | | 382/232 |
| 2013/0298083 | A1* | 11/2013 | Bertoldo | G06F 3/0482 |
| | | | | 715/835 |
| 2014/0283086 | A1 | 9/2014 | Schultz et al. | |
| 2016/0203352 | A1* | 7/2016 | Marsico | G06K 7/1417 |
| | | | | 235/375 |
| 2020/0210664 | A1* | 7/2020 | Taylor | G06K 7/1443 |
| 2020/0320272 | A1* | 10/2020 | Kopansky | G06V 20/17 |

OTHER PUBLICATIONS

"Combined Search and Examination Report" in GB 1906356.9, dated Apr. 7, 2020.
"Search Report" in GB 1906356.9, dated Apr. 7, 2020.
"Amended Specification (tracked)" in GB 1906356.9, dated Nov. 12, 2020.
"Response Letter" in GB 1906356.9, dated Nov. 12, 2020.
"Intention to Grant" in GB 1906356.9, dated Apr. 1, 2021.
"Notification of Grant" in GB 1906356.9, dated May 18, 2021.
"Certificate of Grant" in GB 1906356.9, dated Jun. 16, 2021.
"International Search Report and the Written Opinion of the International Searching Authority" in PCT/IB2020/054295, dated May 6, 2020.
"Combined Search and Examination Report under Sections 17 & 18(3)" in GB patent application No. GB1906356.9, dated Apr. 7, 2020.
"Search Report under Section 17" in GB patent application GB1906356.9, dated Apr. 4, 2020.

* cited by examiner

1. Free flow of data allowed between networks

— Data
→ Video

2. Large flow of data allowed between networks via complex expensive guard devices G Gateway 3. Very limited flow of data (known data types) allowed between networks via guard devices.   Flow of volume, or loosely formatted GIS Data is inhibited 4. No flow of data is allowed between networks

IMAGING SYSTEM FOR SUPERIMPOSING AT LEAST TWO IMAGES AND A RELATED METHOD

FIELD

The present invention relates to an imaging system for superimposing at least two images and a related method for superimposing at least two images, the images are obtained from separate or independent image sources.

More particularly, but not exclusively, the invention relates to a method for geo spatial mapping and display of multiple geo referenced elements, where respective geo referencing elements and data sets are provided on different systems, and where transfer of data between such systems is severely limited or prohibited. An output image on a display is a combination of data from two or more systems and provides a common operational or operating picture.

BACKGROUND

Geographic mapping overlay is a technique which employs digital techniques to combine two or more geographic mapping overlays, often from more than one different image or data source. Overlays are computer graphic image representations created from geographically related images or data.

Image sources may include photographs, aerial images, and satellite images, digitised images and images provided in a digital format, for example from one or more computer systems.

Data sources consist of structured data which can be transformed to provide image representations (image data sets, consisting of multiple image elements or symbols) related to the structured data and rendered as an image (image data set). Mapping overlay techniques are used to combine more than one image and/or to combine image data with data from other sources in order to provide a holistic geographic mapping view.

The use of computer based geographic mapping systems, also termed geographic information systems (GIS) is commonplace in defence, cartography, government, business, and social activity. Computer based systems provide a graphical view of a physical or 'real-world' environment, which may be overlaid with other information which can relate data, at a particular physical position in the 'real world', to a location on a base map.

A geographic information system (GIS) provides a base mapping system over which other data may be rendered. In use a user is able to select an area of map to view, and one or more related image data sets (or overlays) which may be viewed when selected, such as roads or infrastructure, or any other geographically related feature or data.

A user is also able to select a desired amount of zoom in order, for example to vary, the amount of detail, which is selected to be viewed, and is able to select the data set which are to be included in any chosen view.

GIS are used in many situations in addition to mapping systems, for example in vehicles to assist directing a driver to a destination location; by emergency services to track emergency events and to assist in locating a position of response vehicles and rescue personnel; by local government to identify specific services based on their location; by businesses to identify business premise locations and business related services and activities. GIS may also be used to track and display events by location; to show statistical data by location or region; to predict future events (such as weather, storms and other natural events) by location or region; and to display historical events or data.

GIS are also used by military, government security and support agencies, and by commercial businesses, to provide overviews of locations and in order to predict trends in data sets, for example so as to provide awareness of situations and to assist with decision making.

In some situations data sets are supplied from different computer systems where direct connection and transfer of data sets between computer systems are often not permitted, for example due to security reasons.

Generally direct connection to unsecured or open networks risks malicious data being transferred between systems or unauthorised copying of data from one system to another or to a memory device. The risks of malicious attack or theft increases significantly where one or more of the systems is not under complete control of the same authority.

There are a number of existing methods and systems for transferring data sets successfully and in an approved and secure manner between systems. These are often expensive and can be complex to implement. These systems for transferring data sets are generally only able to transfer specified data sets in accordance with stringent rules. Data sets that do not comply with a prescribed rulesets are automatically denied access to such systems and so cannot be transferred or used.

In some instances, as not all necessary information was able to be used or made available when needed, decision making was compromised as a consequence. The transfer of an image representation or data set can be conducted as a one way data transmission and systems that operate in this manner are less costly and readily available however one way data transmission still involves the risk of malicious data being transferred between systems.

The inability to transfer data sets between systems, for example as a consequence of non-compliance with a ruleset, was previously overcome by an operator or user having to view two or more different screens or displays, showing different views from different data sets. In order to meet stringent data security criteria this had to be on physically separate display devices of independent and unconnected computers with isolated domains and processing systems. In this situation users had to mentally construct an overall view of a combined image in order to understand the situation and in order to make a required decision.

Additionally to ensure a similar view on each system, mechanisms were required to manually set the view on each display to correspond to other displays, errors in display region risked mis-interpretation and incorrect decisions.

PRIOR ART

International Patent Application number WO-2013/106080 (Pictometry Int. Corp.) discloses an image capture system with one or more video capture devices capable of capturing one or more video frames. The video frames include geographic position data and associated orientation data and may be stored in one or more non-transient machine readable formats. The system oversees video frames to one or more processors for geo-referencing and overlaying of geographic information system (GIS) data in real time.

US 2008/068507 (Krause et al) discloses a method for managing the insertion of overlay content into a video signal. A video signal is received from a video source and overlay content is provided in one or more overlay content signals. A tag is appended to the video signal and/or the overlay content signals. The tag contains identification data and overlay content is selected from one of the overlay content signals which may then be inserted into the video signal in accordance with the identifying information to produce a modified video content.

US 2011/0432627 (Werling et al) discloses a system and method for providing a combined video stream with geospatial information. A visualisation tool synchronises information in a virtual camera with attributes, such as video frames, from a real camera. When position data of the real camera is supplied to the visualisation tool, geospatial data, (such as terrain features or man-made features) can be retrieved. The camera position information is transformed into a coordinate system of the virtual camera. The visualisation tool uses the coordinate system of the virtual camera to generate geospatial snapshots.

U.S. Pat. No. 5,414,462 (Veatch) discloses a method and apparatus for generating a comprehensive land survey map in which an image base map of a geographical survey region and a legal description map for each land parcel (or lot) within the geographical survey region are stored in a geographic information system (GIS). The precise position data generated by the remote device is supplied to the GIS, which uses the data to correlate and align a legal description of a map for the parcel of interest with a portion of the image base map to create a comprehensive survey map for that parcel.

The aforementioned system would not operate where the basemap and legal documents were in different security domains to the sensing system and no data path is defined between domains.

Many of the aforementioned systems operate in a single security domain and can only operate where data transfer from the remote sensing device can be provided.

U.S. Pat. No. 9,191,391 (Architecture Technology Corp) describes techniques for controlling transfer of information, in a secure manner across multiple network security domains. So called cross-domain sharing may be facilitated by use of a common model that is shared by participants from different network security domains. A cross-domain object model specification specifies object classes for cross-domain objects that are accessible by authorised computing devices.

US 2017/048259 (Raytheon Corp) discloses a secure cross domain system for example for transfer of data across a security boundary. The system includes a high side domain that is coupled to a transfer guard module. A high side domain includes a data repository and a first review module which is executable by processing circuitry to determine whether a permission level of a first content violates a permission level of the high side domain. A second review module is executable by the processing circuitry to determine whether second content, from the high side data repository, includes a permission level that violates a permission level of a low side domain.

Although successful, some of the aforementioned systems were complex and expensive. Another drawback of some systems was that they limited data speeds and so were not always able to be implemented in real time scenarios.

Though direct connection and data transfer may not be allowed, in some cases very limited data transfer or a connection via what is effectively a unidirectional video channel is allowable, as the risk of data loss or malicious attack via this type of channel is significantly reduced to the point where it is deemed acceptable.

An aim of the present invention is to provide a system and method that overcomes the aforementioned problems.

Another aim of the present invention is to provide a system and method that is capable of providing a single mapping based view of a user selected geographic area onto which multiple image and image data sets, for example from separate computer systems, may be displayed, optionally in real time without the need and the risk, of transferring the data set between computer systems.

SUMMARY OF THE INVENTION

According to a first aspect of the present invention there is provided an imaging system for superimposing at least two images obtained from at least two independent image sources or data sources, the imaging system includes: a position code generator that is operative to obtain position data of at least a first region of interest (ROI) in a first image, and to generate a first image data set and a first position code corresponding to the at least first ROI; at least one secure transmission channel is operative to transfer at least one of: the first image data set and the first position code, to a position code extractor; upon receipt of the first image data set and the first position code, the position code extractor is operative to derive location specific data which corresponds to the at least first region of interest (ROI); an identifier is operative to configure image data derived from at least a second image and to identify, using the location specific data, a region in the second image that corresponds to the at least first ROI; a combiner is operative to manipulate the first image data set, defining the at least first ROI, with image data from the region in the second image and to superimpose the at least first ROI and at least the image data from the region in the second image so that they are in register one with another, thereby enabling a user to obtain a combined image of the least two images; and a display presents the combined image which includes the at least first ROI.

The system provides a single mapping based view which enables independent image data sets, from multiple computer systems, to be overlaid without any requirement to meet complex and costly security provisions of a secure computer system, when transferring data sets between computer systems.

As mentioned previously though direct connection and data transfer may not be allowed, in some cases very limited data transfer or a connection via what is effectively a unidirectional video channel is allowable, as the risk of data loss or malicious attack via this type of channel is significantly reduced to the point where it is deemed acceptable.

Digital mapping (GIS) systems are used by military, government security, local authorities, support agencies, and by commercial businesses, to provide views based upon locations and in order to provide awareness of situations and to assist with decision making in real world or legal or strategically complex situations, or to predict trends in data sets.

In many situations, GIS data sets are available on different computer systems or networks and direct connection and transfer of data sets between computer systems or networks is often not permitted, for example due to security reasons. These networks are described as working is separate "security domains".

The inability to transfer data sets normally results in multiple map displays, each displaying data from the specific data sources, which is not usually available on all networks. This results in users having to mentally "fuse" information from multiple views in order to interpret an overall situation and make subsequent decisions.

In time or mission critical situations this process is stressful and so undesirable for a number of reasons.

As mentioned above prior art systems and networks did not generally allow direct connection as this risks malicious data being transferred between systems or unauthorised copying of data. The risks of malicious attack or theft increase significantly where one or more of the systems are not under complete control of the same authority. In some cases connection is allowed via specialised gateway devices. However, these devices are complex and expensive and in most cases are not available to manage the volume, and free flow formats of many GIS data sets.

According to a second aspect of the invention there is provided a computer system for displaying superimposed images on a display using image data from at least two image data sources comprises:

at least one memory which stores software;

at least one processor which processes data from a first base map and a first image data set to generate a first map view in accordance with a user request; a position code generator is operative to obtain position data of at least a first region of interest (ROI) of the first map view, at least one secure transmission channel is operative to transfer at least one of: the views of the first map view and the first position code to at least a second processor; a position code extractor operates on receipt of the first map view and the first position code to derive location specific data corresponding to the at least first region of interest (ROI);

the second processor uses location specific data to process data from a second base map and a second data set to create a second map view that corresponds to the at least first ROI; and a combiner is operative, in accordance with software, to manipulate the first map view and the second map view and superimpose the two map views so that the two map views are in register one with another to provide a combined map and to extract at least one base map view from the combined map whilst retaining both image data sets thereby enabling a combined image of the at least two images to be displayed;

and a combined image signal, representing the combined image, is output to the display.

An advantage of the system and method therefore are that computer systems, whose security access levels may have different levels of security clearance, are able to send and receive image representations of data sets, and combine these images to form a single view, with accurately overlaid representation(s) of the data set(s), with a greater level of assuredness, thereby providing a combined view, whilst maintaining the integrity of individual computer systems.

In some embodiments the computer system includes two processors operating independently one from another, a first processor processes the first image data set and a second processor processes the second image data set.

In some embodiments the computer system includes two secure transmission channels that provide separate communication pathways for the first map view and first image data set, respectively.

In some embodiments the computer system is operative as a means to obliterate selected features from at least one base map whilst retaining selected image data.

In some embodiments of the computer system includes a means to select variable basemap chromatic levels.

In some embodiments of the computer system includes a means to vary transparency of a base map to a viewer.

In some embodiments of the computer system includes a means to vary image data set transparency to a viewer.

In some embodiments of the computer system includes a means to scale at least a portion of a map or an overlaid view.

In some embodiments of the computer system includes a means for chromatic variation of a selected feature in a base map.

In some embodiments of the computer system includes a means to enlarge/reduce, (zoom in and out of) a selected map view.

In some embodiments of the computer system includes a means to compensate for movement due to enlargement/reduction and resizes and realigns image data sets.

Preferably at least one computer implemented program is provided which is executes code in a processor to render it operative to generate a single mapping view by the overlaying of geographic map views from different systems without the need to transfer the required data set between systems.

Another advantage of the invention is that it enables the overlaying of GIS data onto a video frame data or video data onto a GIS basemap. In a preferred embodiment a means is provided to align GIS data onto video frame data and vice versa, thereby benefitting from the advantages of digital mapping and geo coordinate referencing.

None of the prior art systems referred to above, provide a mechanism to overlay GIS data, from differing security domains, onto a video, or basemap.

Furthermore none of the prior art systems referred to above are capable of transferring high volume GIS data between systems on differing security domains in an acceptable manner.

Furthermore none of the prior art systems referred to above provides a mechanism to transfer geo-referenced coordinate data including video data, between security domains such that alignment can be obtained.

None of the prior art systems referred to above provides a visual code embedded within a video channel with non-visual information within a live video stream.

Another disadvantage with many of the aforementioned prior art systems, is that none provides a mechanism to select a map based view from anywhere within the globe at any standard zoom level.

Where multiple views in different security domains are required, there is often a need to pass data between domains; none provide a global view, none provide an alignment mechanism to ensure views of a single ROI, and none provide a mechanism to remove the unwanted video portions for each view to enable a single basemap view.

The at least one computer program includes a computer readable storage medium having program instructions embodied therewithin.

The program instructions are readable and executed on the differing computer processing systems to cause the differing displayed maps and data to be synchronised in spatial view, and further instructions and methods are executed to enable the spatially synchronised views to be combined to provide a single map view with all required data sets overlaid.

The synchronisation method comprises the means to define one map view as a primary view and the means to extract the map boundaries, or map centre coordinates and level of zoom, and to transfer this limited data set to all other mapping systems. All mapping systems less the primary include a method to read the limited data set and calculate the required region of interest (ROI) map boundaries, or centre and zoom level, and to then align the user requested map and data set to the ROI, those boundaries, or centre and zoom level such that all map views are of the same geographical area with respective data sets in view.

The combining method comprises the means to select variable basemap chromatic colours and variable basemap transparency, and variable image data set transparency. The combining method also includes the means to scale and place the respective map views overlaid upon one another, with generally the chosen basemap as the lower layer. Additionally the combining method comprises the method to chromatically remove the chromatically chosen basemaps resulting in a single view of all image data sets overlaid on the selected basemap whilst being correctly geographically aligned. Moving or zooming of the selected primary map view results in the movement and alignment of all selected views and data sets.

According to a third aspect of the invention there is provided a method of operating the imaging system comprising the steps of: obtaining position data of at least a first region of interest (ROI) in a first image, and generating a first image data set and a first position code corresponding to the at least first ROI; transferring at least one of: the first image data set and the first position code, to a position code extractor via at least one secure transmission channel; operating the position code extractor to derive from the first image data set and the first position code, location specific data which corresponds to the at least first region of interest (ROI); configuring an identifier to derive image data from at least a second image and using the location specific data to identify a region in the second image that corresponds to the at least first ROI; employing a combiner to manipulate the first image data set, defining the at least first ROI, with image data from the region in the second image and superimposing the at least first ROI and at least the image data from the region in the second image so that they are in register one with another, thereby enabling a user to obtain a combined image of the least two images; and presenting on a display the combined image which includes the at least first ROI.

According to a fourth aspect of the invention there is provided a computer implemented method of operating the imaging system for displaying superimposed images on a display using image data from at least two image data sources comprising the steps of:

processing data from a first base map and a first image data set and generating a first view in accordance with a user request;

deriving from a position code generator position data of at least a first region of interest (ROI) of the first map view;

transmitting at least one of: the view of the first map view and the first position code to the at least one processor via a secure transmission channel;

operating a position code extractor on receipt of the first map view and the first position code to derive location specific data corresponding to the at least first region of interest (ROI);

processing using a second processor location specific data from a second base map and a second data set to create a second map view that corresponds to the at least first ROI; and operating a combiner, in accordance with software, to manipulate the first map view and the second map view and superimpose the two map views so that the two map views are in register one with another to provide a combined map and extracting at least one base map view from the combined map whilst retaining both image data sets, thereby enabling a combined image of the at least two images to be displayed; and outputting a combined image signal, representing the combined image, to the display.

It is appreciated that aspects of features relating to the system are also included as preferred or optional steps in the method.

Preferred embodiments of the invention will now be described, by way of example only and with reference to the Figures in which:

BRIEF DESCRIPTION OF THE DRAWINGS

FIG. 6 indicates where free flow of large amounts of data enable normal data transfer protocols to be used in order to produce a single view or a combined image. However, where only very small amounts of data are transferred, as shown in FIG. 7, between networks, the method according to one aspect of the invention, enables the production of a single view or combined image.

DETAILED DESCRIPTION OF PREFERRED EMBODIMENTS OF THE INVENTION

Figure 1:
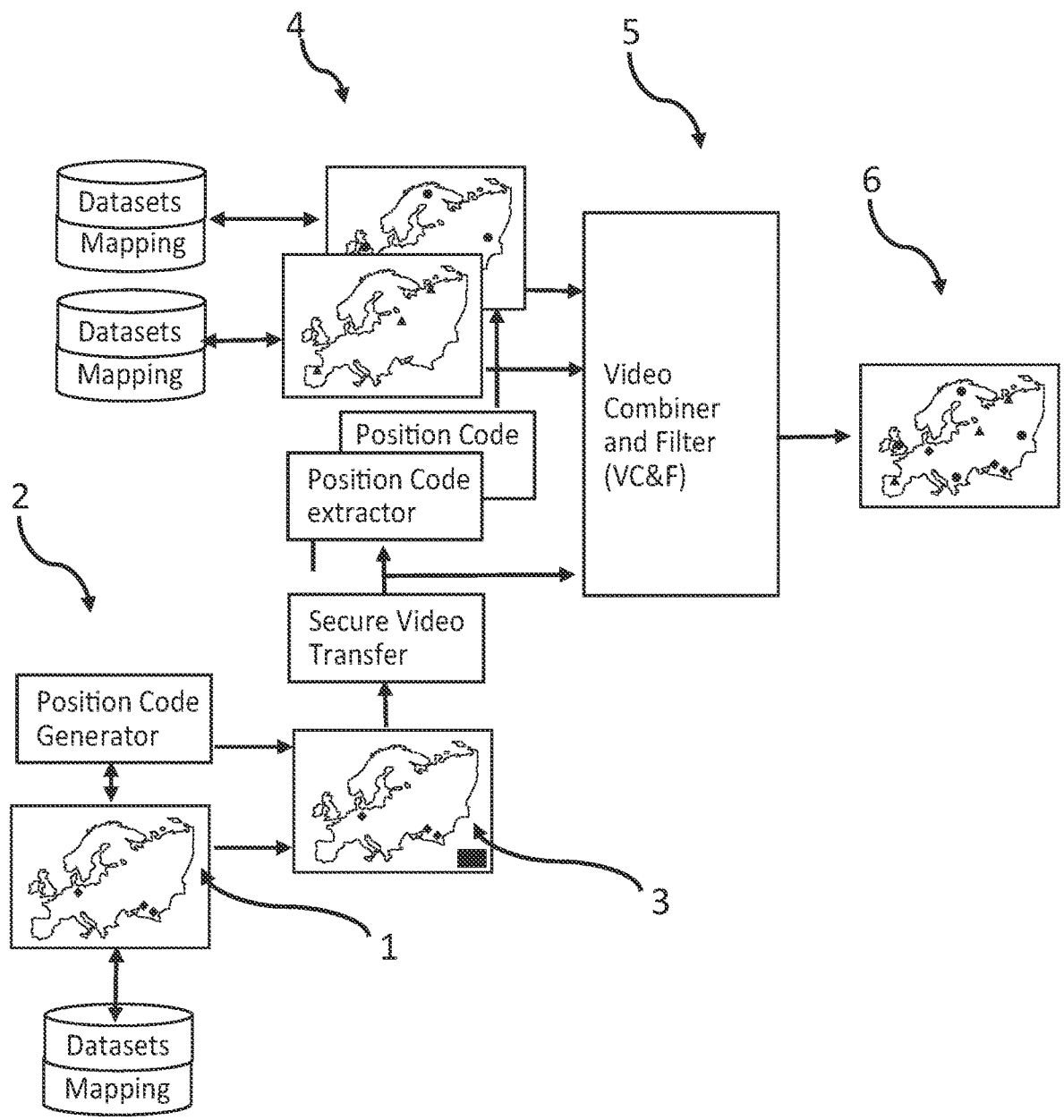
FIG. 1 is a schematic diagram illustrating one example of system which overlays geographic related image data from differing computer systems so as to ensure autonomy of input data from respective sources.
Figure 2:
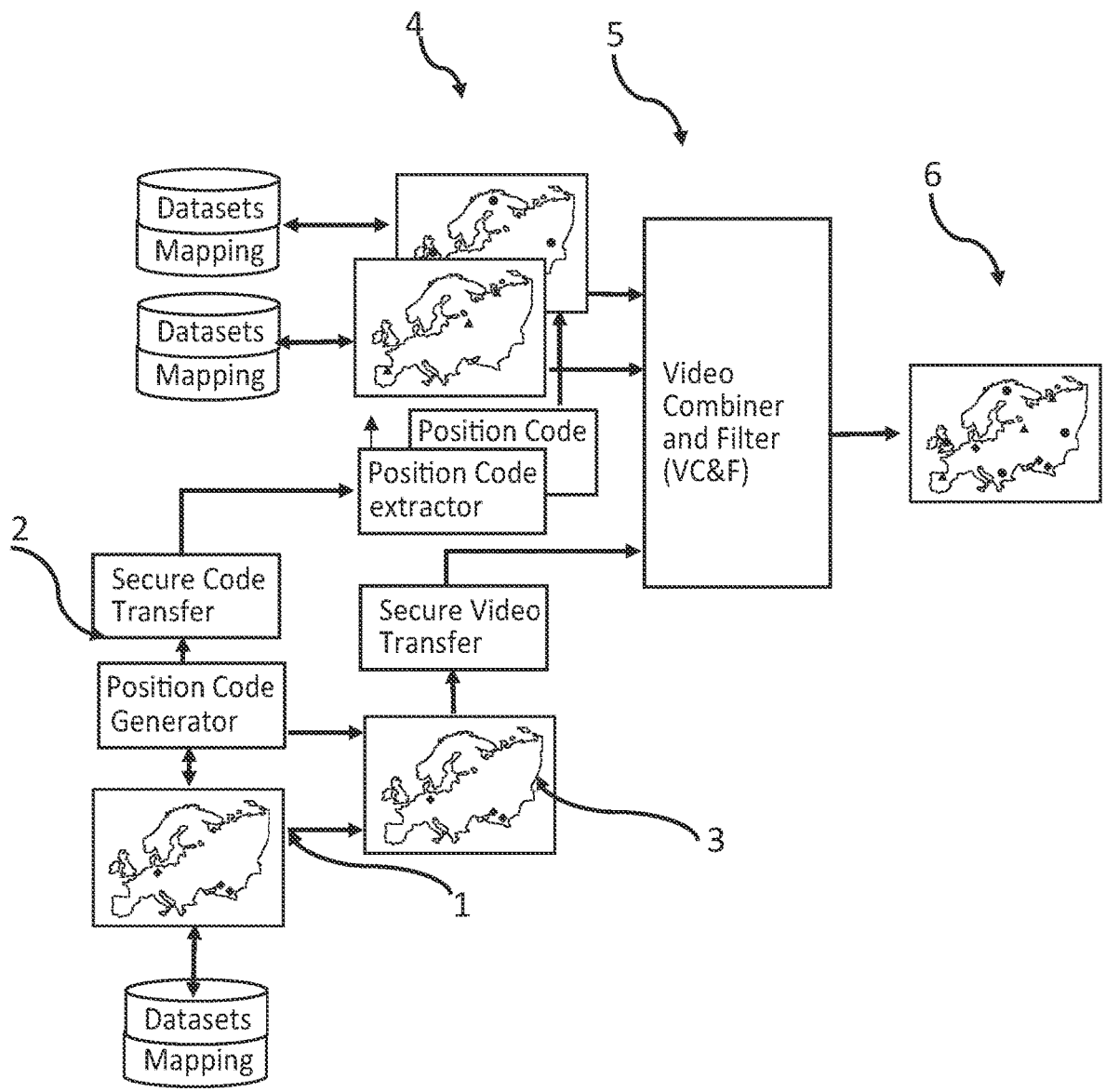
FIG. 2 shows a similar schematic diagram to FIG. 1 and illustrates one example of system which overlays geographic related image data from differing computer systems so as to ensure autonomy of input data from respective sources.

Referring briefly to FIG. 1, which shows how mapping view images and position codes are transferred by embedding of the position code onto the map view; and to FIG. 2, which indicates how mapping view images and position codes are transferred by separate transmission channels.

FIG. 2 indicates how related image data, from isolated computer systems (or data sources) 1, and 4, is combined to a single view 6 by way of a position code generator 2, and a video combiner and filter 5 which removes the need to pass data between systems 1, and 4. Rather than use conventional data file sharing techniques, synchronisation of overlays is achieved by transmitting only ROI data, as an encoded or encrypted position code embedded within a mapping video display 3, or transmitting ROI and mapping video display through differing transmission channels.

Figure 4:
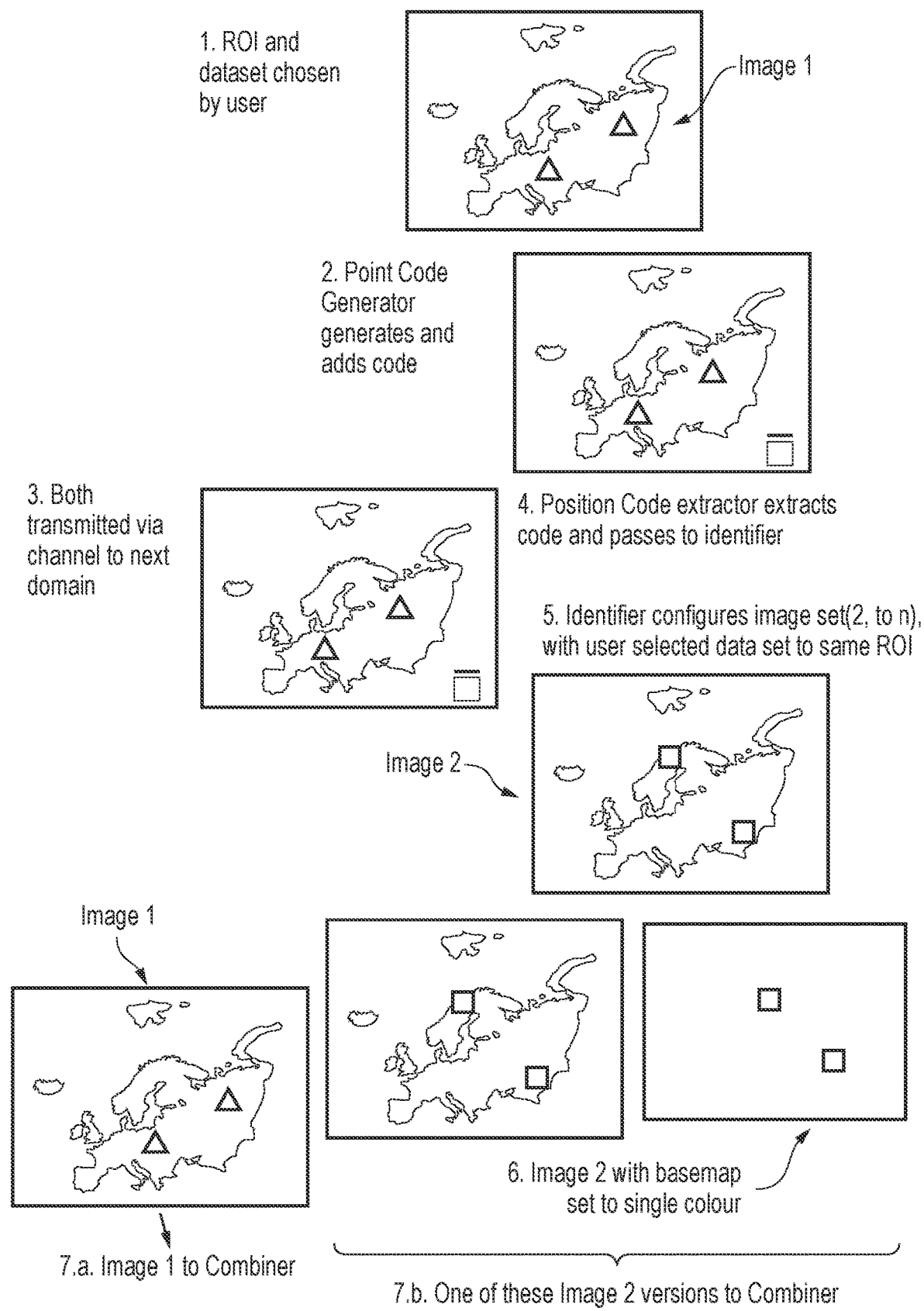
FIGS. 4 and 5 show in detail key stages in generation of a position code and how an identifier helps to configure an image data set, from at least one image in order to overlay image data over a region of interest (ROI)
Figure 5:
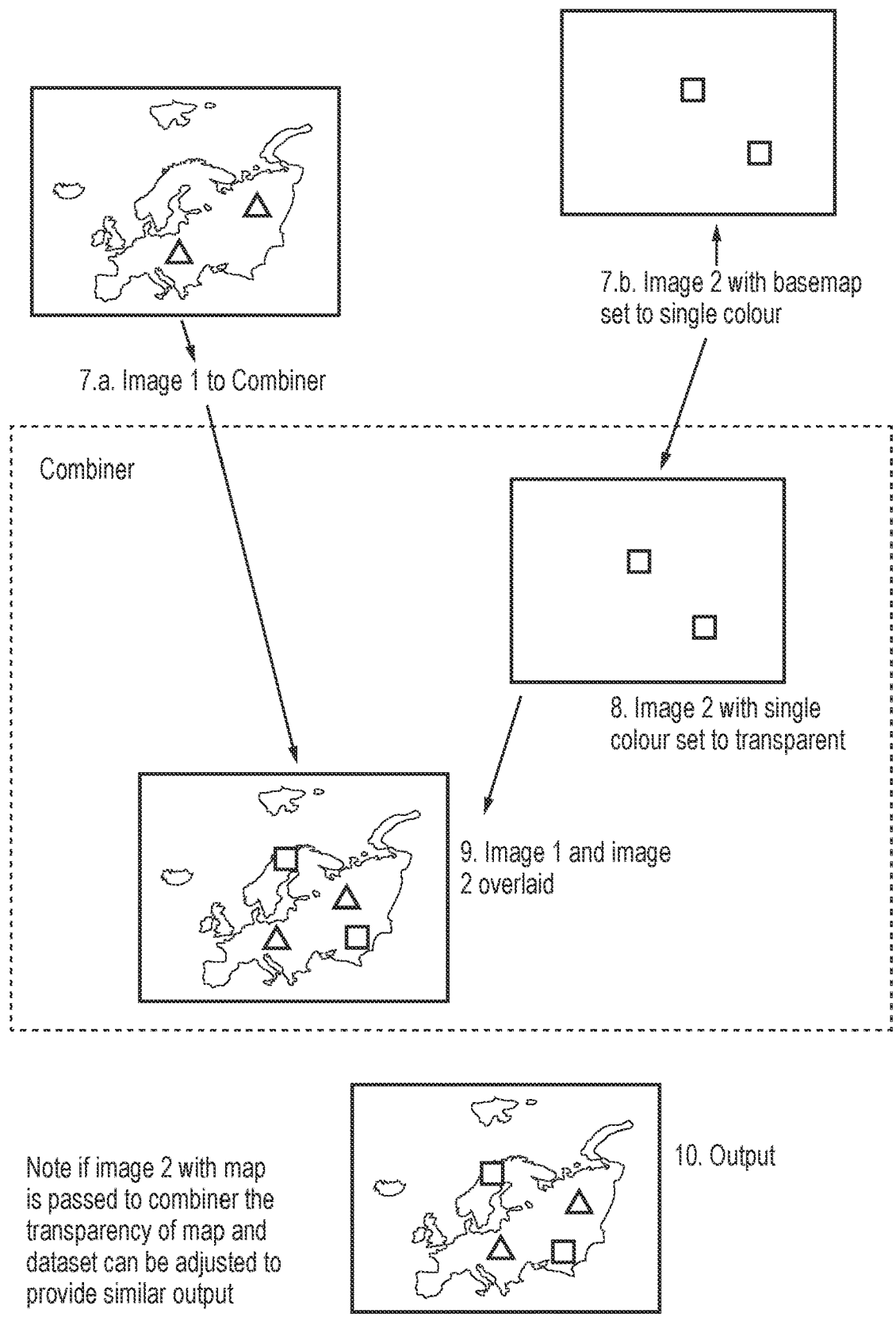

Referring in detail to FIGS. 4 and 5, there is shown an example of an imaging system 10 for superimposing at least two images A and B obtained from two independent image sources 20 and 22. The system 10 includes: a position code generator 30 that is operative to obtain position data of at least a first region of interest (ROI) from the first image A. The position code generator 30 generates a first position code, such as barcode or preferably a QR code 40 corresponding to the at least first ROI. The position code is added to the first image data set 32 to produce a view which includes the basemap, image data set and position code.

In another embodiment the secure transmission channel may be an optical fibre that transfers at least one of: the first image data set and the first position code, to a position code extractor 60. The position code extractor 60, upon receipt of the first image data set 32 and the first position code 30, derives location specific data which corresponds to the at least first region of interest (ROI).

An identifier 70 derives image data from at least a second image and identifies, using location specific data, the region in the second image B that corresponds to the at least first ROI. A combiner 80 manipulates the first image data set, defining the at least first ROI, with image data from the region in the second image and superimposes the at least first ROI and at least the image data from the region in the second image so that the two images 72 and 74 are in register one with another. This thereby enables a user to obtain a combined image, (shown as 76 in FIG. 5) of the least two images 72 and 74. A display 90 presents the combined image which includes the at least first ROI.

Figure 3:
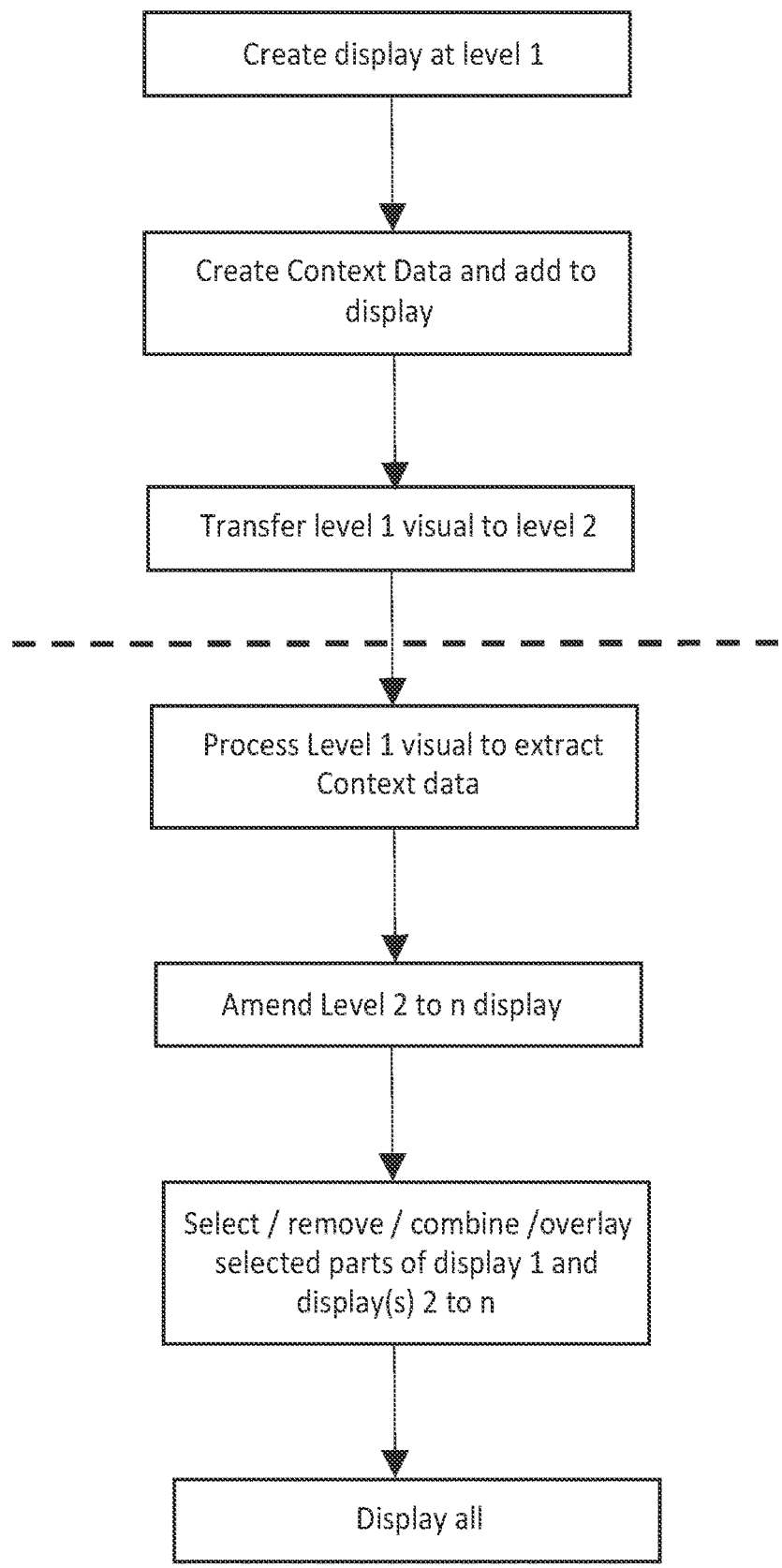
FIG. 3 is a flow diagram of a computer implemented method of one embodiment of the invention.

As will be described below, a method is shown in FIGS. 3 and 8, which illustrates key steps in the overlaying of image data sets from differing computer systems in order to provide the user with a single combined view of the data sets. The principle is illustrated diagrammatically in FIGS. 6 and 7.

Referring again to FIGS. 1 and 2 a map view 100 from one system 102 is generated by the computer system at 106. A user has control of this view and can add data sets and other graphics as required to create a user defined view. Other data sets on other computer systems 110 are not allowed to be transferred to this computer 106 system.

Control of the location to be inspected and level of zoom, at which the map and associated data is viewed, and which data sets and graphics are viewed. A user can also select from a menu of basemap tilesets (not shown) different image content data and/or colour.

A processor (not shown) is operative under control of computer software to implement the position code generator to calculates the extent of the map view and provides this data as a computer graphic. The computer program overlays this graphic onto the map view, 3, or other display view.

Still referring to FIG. 1 the provided map view is transferred by an agreed video transfer method to other computer systems 4. The user on systems 4 can control the location and level of zoom at which the map, and associated data is viewed, or to select that the location and zoom are defined by the first system 1. The user can also choose from a selection of basemap tilesets which differ by content and by colour, and which data sets and graphics are viewed.

By implementation of a position code extractor the computer program at system 4 decodes the computer graphic containing the map extent information and sets the respective computer map view to show the same map view with any associated data sets and other graphics.

Still referring to FIG. 1 the resulting map views are provided to a video combiner. By selection of different control options on the respective mapping views and at the video combiner the user can select the transparency of individual maps and map data sets providing a single view of data sets correctly related on the map.

Referring now to FIG. 3 there is shown a flow diagram of a computer implemented method of one embodiment of the invention.

In accordance with further embodiments and still referring to FIG. 1 the resulting map views are provided to a video combiner. By selection of different basemap tileset control options on the respective mapping views and at the video combiner and filter the user can remove individual basemaps of all views other than the required map providing a single map whilst retaining the view of all data sets correctly related on the map.

In accordance with further embodiments and with reference to FIG. 2 once the map extents are calculated by the computer program (using the position code generator) the extents are transferred as data via an agreed data transfer device such as a secure data channel. The data transfer device only permits only a limited amount of correctly structured map extent data to be transmitted.

Still referring to FIG. 2, the selected view is transmitted via the secure video channel. As described above the user on these systems 4 may control the location and level of zoom at which the map, and associated data, is viewed. The user may also specify that the location and zoom are defined by the first system.

The computer program, 4 by use of the position code extractor decodes data containing the map extent information and sets the respective computer map view to show the same map view with any associated data sets and other graphics.

Referring again to FIG. 2 the resulting map views are provided to a video combiner 5. By selection of different control options on the respective mapping views and at the video combiner 5 the user selects the transparency of individual maps and map data sets providing a single view of data sets correctly related on the map indicated as 6.

Referring again to FIG. 3 an overview of the process and method is provided. A user selects the data sets and map view extents by using controls (not shown) located on a screen or menu adjacent to the map, or by selecting them from pre-defined views. Users also select the basemap to be used for each view. One view is chosen as a primary view and the computer program calculates the map extents from this view. The map extents are passed from this view to the other views in an agreed method, for example as described below with reference to FIGS. 4 and 5, typically by embedding within the video visualisation or by a separate transfer method.

The computer program on the other map views decodes the map extent data and synchronises the map view to the same as the primary view.

In some prior art systems, positional data for individuals or vehicles may be provided from GPS devices and transported over radio systems or the internet. This positional data is not available on different security domains (higher security domains) as data transfer between the domains is not allowed. This is due to the high risk of data loss or malicious activity. The present invention overcomes these problems by allowing location of individuals to be displayed, with correct geo-referencing, and without a direct data connection and so removes the risk of data breach and malicious attack.

All views are passed to a video combiner and video filter 5. The video combiner selects only the extent of the map visual and when selected filters the basemaps, using video chromatic filtering processes, from maps as selected by the user. The user can also select the transparency level for each map and data set. Basemap, data set and view remain selectable by the user throughout the process enabling multiple views to be derived and selected. The combined video view is provided as a combined output as shown on display 6 in FIGS. 1 and 2. The user views a single view, enabling better understanding of the overall situation.

With reference to the above descriptions a system is provided which enables a user to select and view multiple map views from differing systems on a single view without the need to transfer data sets between the systems thereby providing a method to view as a single view without the risk associated with transfer of data. The system is enabled by two key characteristics, the synchronisation of maps by the use of a position code generator, transmission, and position code extractor to calculate a transfer of map extent and the combining and filtering of views to provide a single view.

Figure 6:
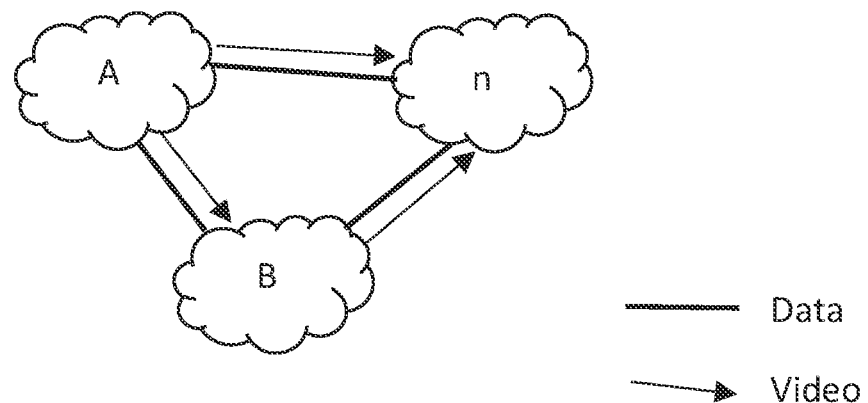
FIGS. 6 and 7 illustrate the problem solved by the invention in diagrammatical form.
Figure 6:
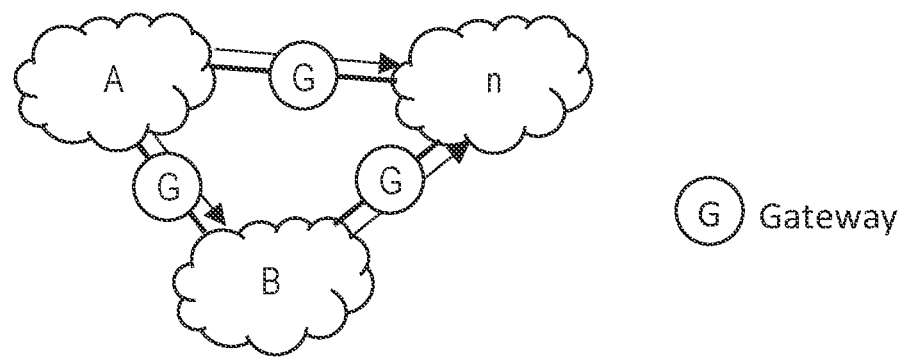
Figure 7:
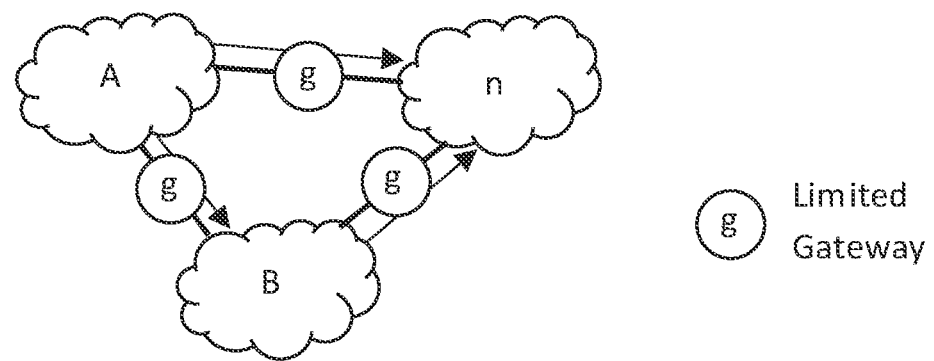
Figure 7:
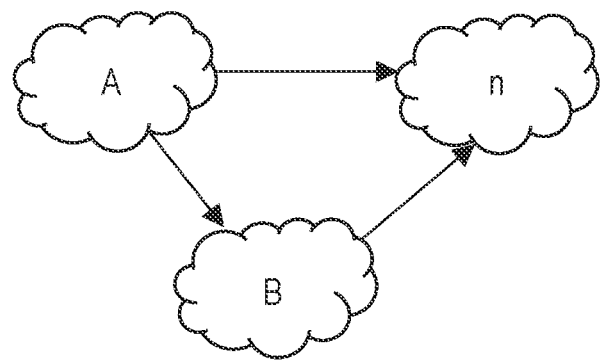

FIGS. 6 and 7 illustrate the problem solved by the present invention in diagrammatical form FIG. 6 indicates where free flow of large amounts of data enable normal data transfer protocols to be used to produce a single view or combined image. In FIG. 7 only relatively small amounts of data transfer between networks is available. The method outlined in the invention will enable the production of a single view (combined picture).

In FIG. 6 where volume flow of data (including GIS data) is allowed between networks, which may have complex and expensive guard devices, the invention as described is able to operate but is unlikely to be deployed because normal data transfer methods are preferable. This is not usually the case in certain government or highly secure corporate networks as there still remains an unacceptable risk of data loss or malicious code transfer between networks.

FIG. 7 shows normal use cases on government or secure corporate networks, where no volume flow of data is allowed between networks (or where guard devices are too complex or expensive to be used) and where conventional data transfer systems cannot operate. Therefore combined mapping views are generally not possible.

The present invention is particularly well suited for use with such systems and removes the risk of loss of data or malicious code transfer.

Figure 8A:
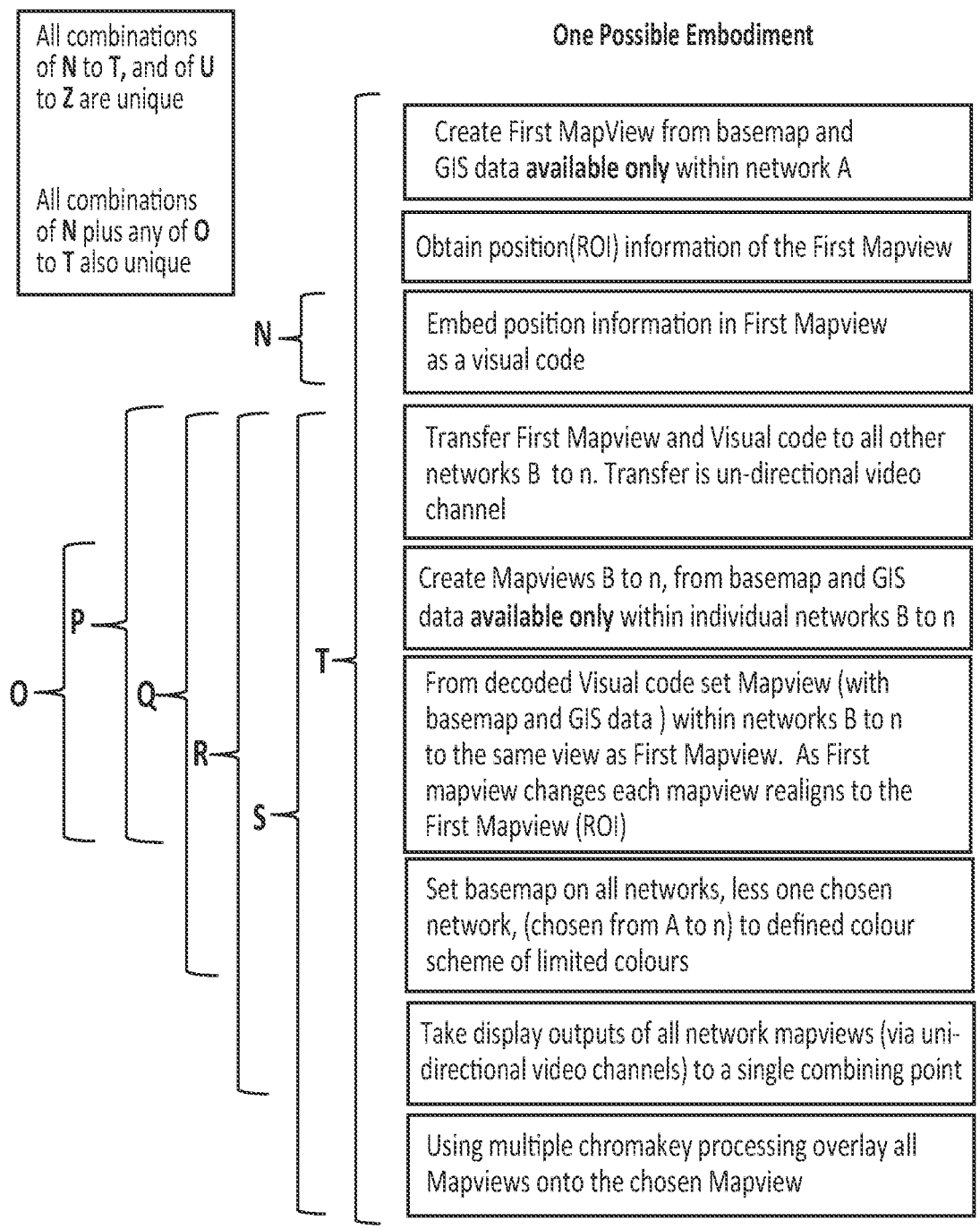
FIGS. 8*a* and 8*b* are flow diagrams showing different process steps of two different embodiments.
Figure 8B:
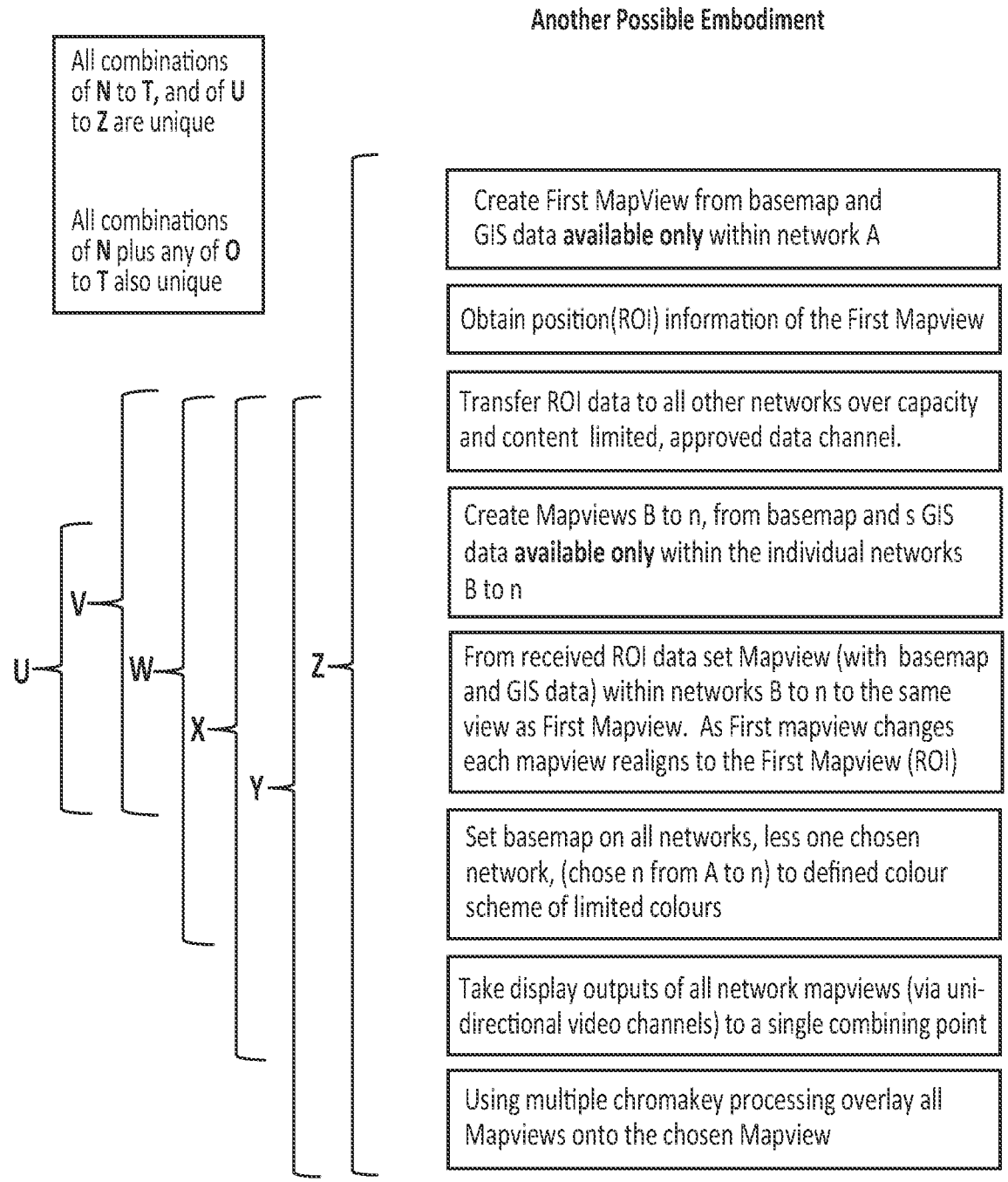

FIGS. 8a and 8b show matrices of input signals for two embodiments. In FIG. 8a position information is encoded as visual code and embedded in a map view for transmission via a single video channel and therefore no data channel is ever at risk of attack.

FIG. 8b uses a limited second data channel which permits a small amount of specific data and so presents a very slight risk which for many organisations is acceptable.

In the embodiment in FIG. 8a (single channel), the position code is manifested as a computer graphic (such as a QR Code or BarCode) and embedded within the sent map view. Both code and map view are transmitted over a video channel which ideally includes some security enhancing features. Video channels by their nature are resilient to attempts to insert malicious code directed at a receiving system or which attempts to extract data from the receiving system. The embodiment with only one channel therefore provides increased security protection when compared to other systems and methods. The single channel embodiment depicted in FIG. 8a results in increased complexity at a sending processor which is required to create and embed the code. Also, at the receiving processor, additional steps are required to capture and decode the visual code, in order to obtain and use the position data. However, this configuration provides very high levels of security and resilience.

In the embodiment shown in FIG. 8b (dual channel), the position code is manifested as normal data (such as text or other standard data format) and retained separately from the map view. The map view is transmitted via a video channel (which may include some security enhancing functionality) whilst the position code data is transmitted via a standard data channel which typically includes some complex data security features. The video channel retains the same security advantages as described above. The data channel, via which the position code is transmitted, may require additional complex security features. Consequently there is some risk that malicious data can also be passed over the data channel.

This dual channel system shown in FIG. 8b is however advantageous where the data channel already exists, or can be easily implemented, and the risk is acceptable. It avoids the complex systems and software that is necessary for visual code embedding and decoding that is required in the single channel embodiment (shown in FIG. 8a), however the dual channel configuration is generally easier and cheaper to implement and so may be acceptable in some situations.

Figure 9:
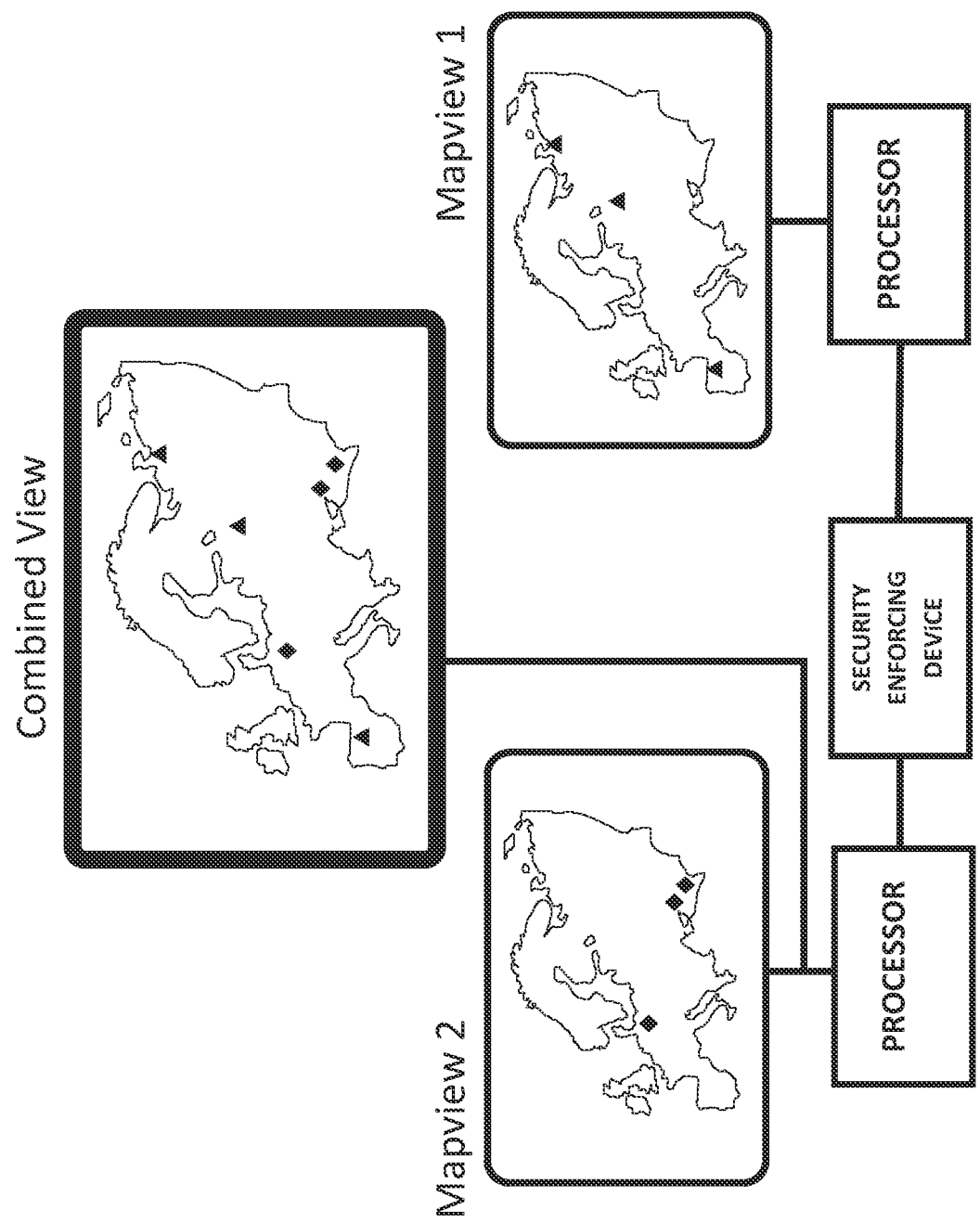
FIGS. 9 and 10 are overall views of further examples of preferred embodiments of the invention.

FIG. 9 shows an example of a system including the invention and shows two separated displays and a combined display.

Figure 10:
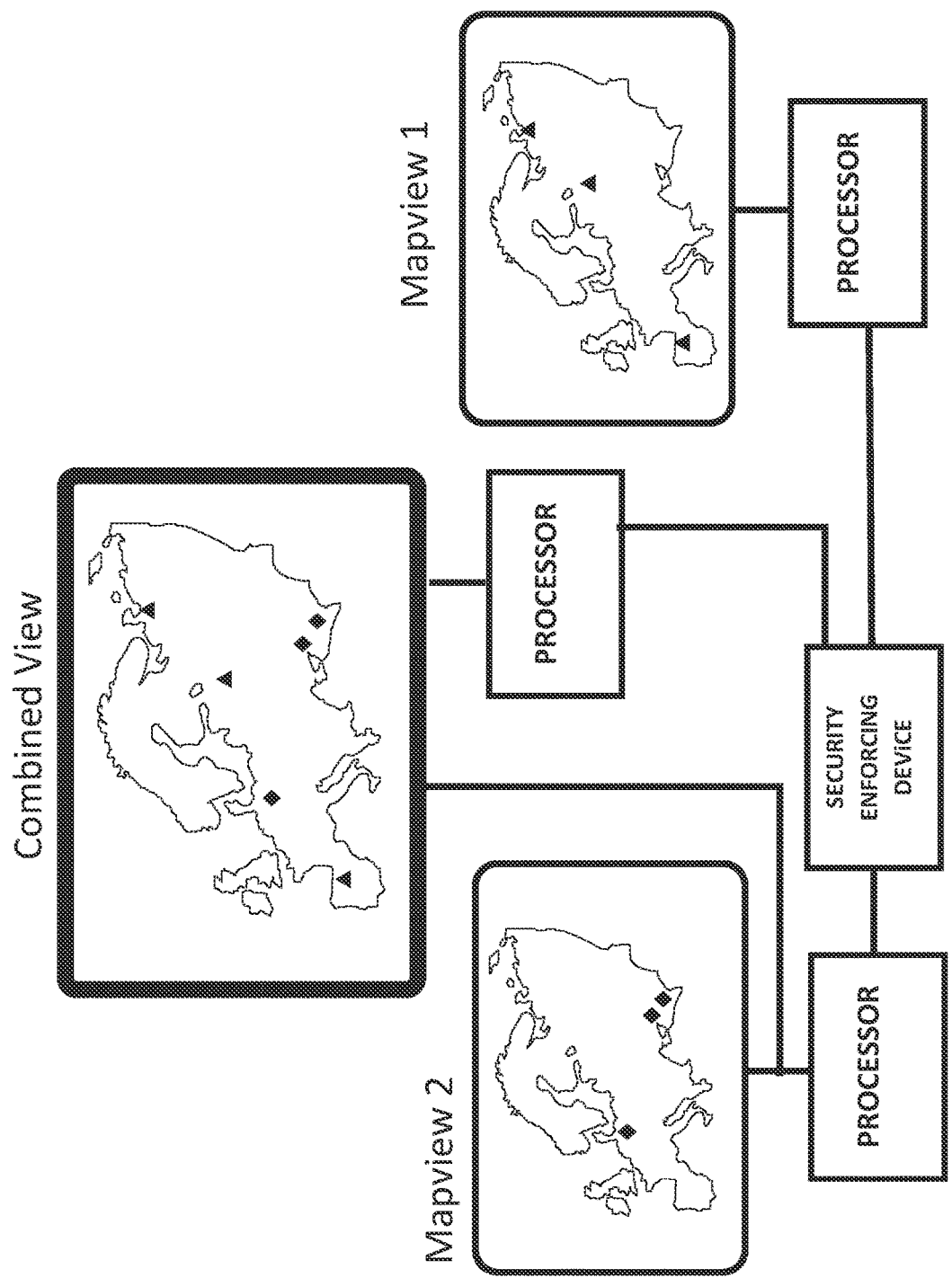

FIG. 10 shows another example of a system including the invention and shows two separated displays, a combined display and a standalone processor which undertakes an image fusion function.

The aforementioned descriptions and embodiments have been described for illustrative purposes and are not intended to be exhaustive or limited to the embodiments described.

It will be appreciated that variation may be made to the invention without departing from the scope of the invention as defined by the claims.

The invention claimed is:

1. An imaging system for superimposing at least two images obtained from a plurality of independent image sources, includes:
    a position code generator to obtain position data of at least a first region of interest (ROI) in a first image of the at least two images, and to generate a first image data set and a first position code corresponding to the at least first region of interest (ROI);
    at least one secure transmission channel to transfer at least one of: the first image data set and the first position code to a position code extractor;
    upon receipt of the first image data set and the first position code, the position code extractor derives location specific data which corresponds to the at least first region of interest (ROI);
    an identifier to configure image data derived from at least a second image of the at least two images and an image processor operating in accordance with image recognition software, to identify, using the location specific data, a region in the second image that corresponds to the at least first region of interest (ROI);
    a combiner to manipulate the first image data set, defining the at least first region of interest (ROI), with image data from the region in the second image and to superimpose the at least first region of interest (ROI) and at least the image data from the region in the second image so that they are in register one with another, thereby providing a combined image of the least two images; and
    a display to present the combined image which includes the at least first region of interest (ROI).

2. The imaging system according to claim 1 further comprising control means to enable user definable image data, derived from at least the first image data set, presented on the combined image as display data.

3. The imaging system according to claim 1 wherein the position code generator includes an encryption means to encrypt the position data of the at least first region of interest (ROI) in the first image.

4. The imaging system according to claim 1 further comprising an encryption means to encrypt the first image data set corresponding to the at least first region of interest (ROI).

5. The imaging system according to claim 1 wherein the at least one secure transmission channel is a wireless channel.

6. The imaging system according to claim 1 wherein the at least one secure transmission channel includes a fibre optic connection.

7. The imaging system according to claim 1 wherein the at least one secure transmission channel includes an Internet connection.

8. The imaging system according to claim 1 wherein the at least one secure transmission channel includes a copper cable connection.

9. The imaging system according to claim 1 wherein the at least one secure transmission channel includes a secure browser.

10. The imaging system according to claim 1 wherein the combiner includes a chromatic controller to vary colour of at least the first image data set.

11. The imaging system according to claim 1 wherein the combiner includes a scaler to overlay the first image with the second image by varying a linear scale.

12. The imaging system according to claim 1 wherein the combiner includes a translator to displace the first image data set along at least one coordinate axis.

13. The imaging system according to claim 1 wherein the combiner includes a means for reconfiguring a projection.

14. The imaging system according to claim 13 wherein the means for reconfiguring the projection reconfigures from a Mercator format to equi-rectangular projection format, and vice versa.

15. The imaging system according to claim 1 wherein the display is on a portable device.

16. The imaging system according to claim 15 wherein the portable device comprises one of a laptop, a tablet, and a mobile communication device.

17. The imaging system according to claim 1 wherein a digital signature of an object of interest is input into the imaging system, the digital signature being derived from a remote camera or imager.

18. The imaging system according to claim 1 further comprising image recognition software employed to automatically scan the first image, for a user specified target, from a prescribed target list.

19. The imaging system according to claim 1 wherein the at least one secure transmission channel to transfers the first image data set in a three dimensional (3D) encrypted holographic format.

20. A method of operating an imaging system for superimposing at least two images obtained from a plurality of independent image sources comprising the steps of:
    obtaining position data of at least a first region of interest (ROI) in a first image of the at least two images, and generating a first image data set and a first position code corresponding to the at least first region of interest (ROI);
    transmitting at least one of: the first image data set and the first position code to a position code extractor via at least one secure transmission channel;
    deriving from the first image data set and the first position code, location specific data which corresponds to the at least first region of interest (ROI);
    configuring an identifier to derive image data from at least a second image of the at least two images and operating an image processor in accordance with image recognition software to identify, using the location specific data, a region in the second image that corresponds to the at least first region of interest (ROI);
    employing a combiner to manipulate the first image data set, defining the at least first region of interest (ROI), with image data from the region in the second image and to superimpose the at least first region of interest (ROI) and at least the image data from the region in the second image so that they are in register one with another, thereby providing a combined image of the least two images; and
    presenting on a display the combined image which includes the at least first region of interest (ROI).

* * * * *